United States Patent [19]

Dekker et al.

[11] Patent Number: 5,004,831

[45] Date of Patent: Apr. 2, 1991

[54] RECOVERY OF HUMIC ACIDS

[75] Inventors: Johannes Dekker, Pretoria; Izak J. Cronje, Verwoerdburg, both of South Africa

[73] Assignee: National Energy Council, Pretoria, South Africa

[21] Appl. No.: 437,174

[22] Filed: Nov. 16, 1989

[30] Foreign Application Priority Data

Nov. 16, 1988 [ZA] South Africa .................... 88/8555

[51] Int. Cl.$^5$ ............................................. C07C 65/01
[52] U.S. Cl. .................................................... 562/475
[58] Field of Search .......................................... 502/475

[56] References Cited

PUBLICATIONS

CA 99(10):73701h 1983.
CA 89(1):5305a 1976.
CA 87(20):154679m.

*Primary Examiner*—Paul J. Killos
*Attorney, Agent, or Firm*—Cushman, Darby & Cushman

[57] ABSTRACT

A method of recovering humic acids from a material such as oxidised coal is provided. This method includes the steps of mixing the material with aqueous alkali, particularly aqueous sodium hydroxide, heating the mixture to a temperature above 100° C. and below 180° C. under sufficient pressure to prevent evaporation of the water, and maintaining the elevated temperature for a time, generally less than 2 hours, sufficient to extract a substantial amount of the available humic acids from the material.

5 Claims, No Drawings

RECOVERY OF HUMIC ACIDS

BACKGROUND OF THE INVENTION

This invention relates to the recovery of humic acids, particularly from oxidised coal.

Various processes are known for producing a solid oxidised coal containing humic acids. One such process involves mixing coal with an aqueous medium to produce a slurry having a pH in the range 4 to 9, reacting the slurry with a gaseous oxidant selected from oxygen, air and mixtures thereof under conditions of temperature and pressure, and for a time, sufficient to cause the oxidation of the coal thereby producing oxidised coal containing humic acids, and separating the oxidised coal containing humic acids from the aqueous medium. This process is described in South African Patent Application No. 88/4770.

Another process is that described in South African Patent No. 87/9232 which involves oxidation of coal in the dry phase with oxygen or mixtures of oxygen and nitrogen in a fluidised bed reactor. The coal with a particle size in the range 100 microns to 3 mm is heated to a temperature of 150° to 300° C. under a partial pressure of oxygen for a time of 30 to 600 minutes.

The traditional way of extracting humic acids from oxidised coal is to slurry sodium hydroxide with the oxidised coal in water in equal amounts to give a concentration of 5 to 10 percent (m/v). For example, 20 grams of oxidised coal and 20 grams of sodium hydroxide are slurried in 300 ml of water.

The slurry is refluxed for 5 hours after which it is worked up to obtain humic acid according to the following scheme:

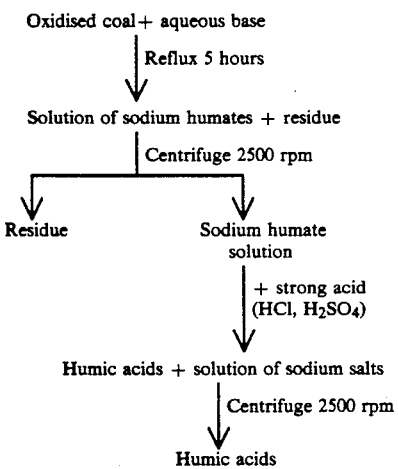

SUMMARY OF THE INVENTION

According to the present invention, there is provided a method of recovering humic acids from a material containing such acids, particularly from oxidised coal, including the steps of mixing the material with aqueous alkali, heating the mixture to a temperature above 100° C. and below 180° C. under sufficient pressure to prevent evaporation of the water, and maintaining the elevated temperature for a time sufficient to extract a substantial amount of the available humic acids from the material.

DESCRIPTION OF EMBODIMENTS

Preferably the mixture is heated to a temperature of 150° to 160° C.

Generally, the elevated temperature will be maintained for a period of 2 hours or less. This results in a significant improvement over the traditional method of humic acid extraction which involves extraction times of 5 hours or more.

One additional major advantage of the invention is that it is possible to obtain excellent humic acid recoveries with much less alkali. In particular, it has been found that alkali in an amount of 1 to 4 times the stoichiometric functional acid group content of the material is sufficient. For oxidised coal, the amount of alkali which will be used will typically be 0.08 to 0.15 grams of alkali per gram of oxidised coal. This is to be compared with the traditional method which requires equal quantities of alkali and oxidised coal.

The alkali will typically be a hydroxide such as sodium hydroxide.

It has further been found that the quality of humic acid produced by the method of the invention is better than that produced by the traditional method because it contains less inorganic material due to the smaller amounts of alkali salts generated.

The humic acids will be produced in the form of water-soluble humates which may be separated from the residue. The water-soluble humates may be converted to the acid form in the manner described above.

Oxidised coal produced following the method of South African Patent Application No. 88/4770 and containing humic acids was subjected to an extraction process using the method of the invention and this was compared with a similar extraction using the traditional method of the prior art. The conditions used and the extractions contained are set out in the table below:

TABLE I

| Conditions | Invention | | | Prior Art |
|---|---|---|---|---|
| Oxidised coal, g | 80 | 80 | 80 | 80 |
| Water, ml | 400 | 700 | 700 | 400 |
| NaOH, g | 10 | 10 | 20 | 80 |
| Temperature deg. C | 160 | 160 | 160 | ±100 (reflux temperature |
| Pressure, MPa | 0,5 | 0,5 | 0,5 | atmospheric |
| Extraction period (hours) | 1 | 1 | 1 | 5 |
| Stirring | yes | yes | yes | — |
| *% Humic acids recovered | 79,57 | 77,74 | 87,89 | 74,9 |
| *% Residue recovered | 22,61 | 23,92 | 12,05 | 25,1 |

*(On Carbon basis Oxidised coal)

It will be noted from the above that much higher humic acid recoveries were achieved using the method of the invention than the prior art method. Further, this improved extraction was obtained using very much lower amounts of sodium hydroxide and neutralising acid making the process of the invention more cost effective. Finally, the extraction periods were much shorter again leading to capital investment and energy savings.

Using the invention as illustrated in the above Table I, the yield of humic acids for various extraction periods was evaluated and the results are set out in Table II below.

| Extraction Period (minutes) | % Humic Acids Recovered (On carbon basis, oxidised coal) |
|---|---|
| 10 | 75, 1 |

-continued

| Extraction Period (minutes) | % Humic Acids Recovered (On carbon basis, oxidised coal) |
| --- | --- |
| 20 | 77, 8 |
| 30 | 78, 4 |
| 40 | 78, 6 |
| 60 | 79, 6 |

It will be noted in Table II that in excess of 75% humic acids was recovered with an extraction period as short as 10 minutes.

We claim:

1. A method of recovering humic acid from oxidized coal including the steps of mixing the material with aqueous alkali, heating the mixture to a temperature above 100° C. and below 180° C. under sufficient pressure to prevent evaporation of the water, and maintaining the elevated temperature for a time sufficient to extract a substantial amount of the available humic acids from the material.

2. A method according to claim 1 wherein the elevated temperature is maintained for a period of no more than 2 hours.

3. A method according to claim 1 wherein the elevated temperature is maintained for a period of no more than 1 hour.

4. A method according to claim 1 wherein the alkali in the mixture is present in an amount of 1 to 4 times the stoichiometric functional acid group content of the material.

5. A method according to claim 1 wherein the elevated temperature is 150° to 160° C.

* * * * *